June 1, 1943.  J. MARCHESE ET AL  2,320,702
APPARATUS AND METHOD FOR MAKING COMPOSITION MATERIAL
Filed Oct. 26, 1939  2 Sheets-Sheet 2
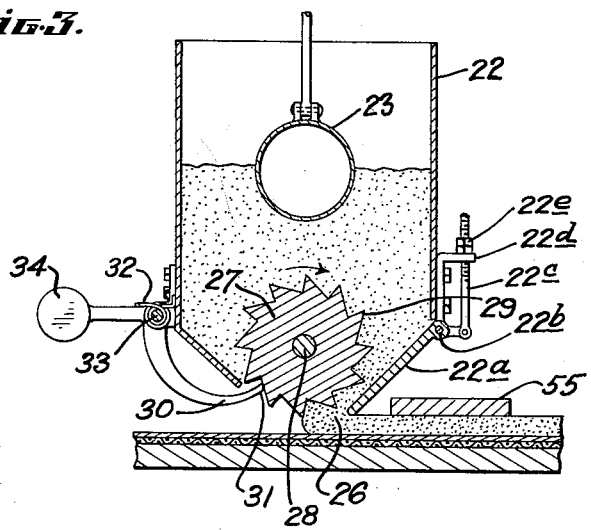
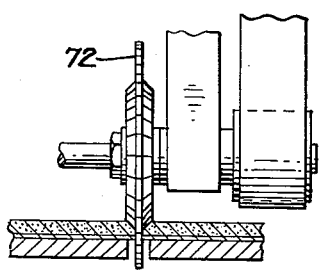
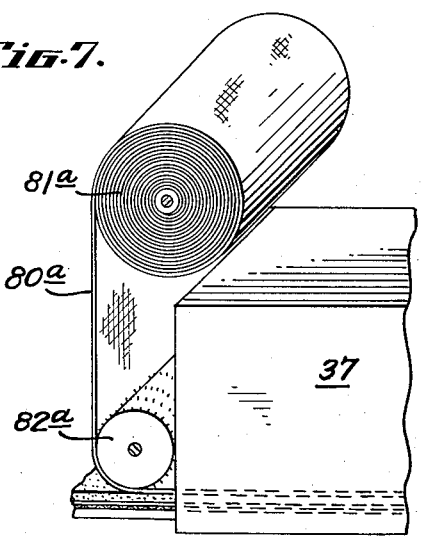
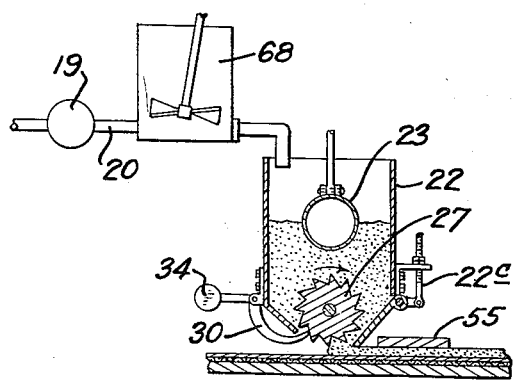
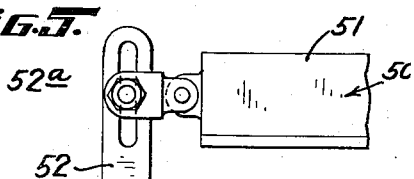
INVENTORS.
STANLEY J. SELDEN
JOHN MARCHESE
BY
ATTORNEY.

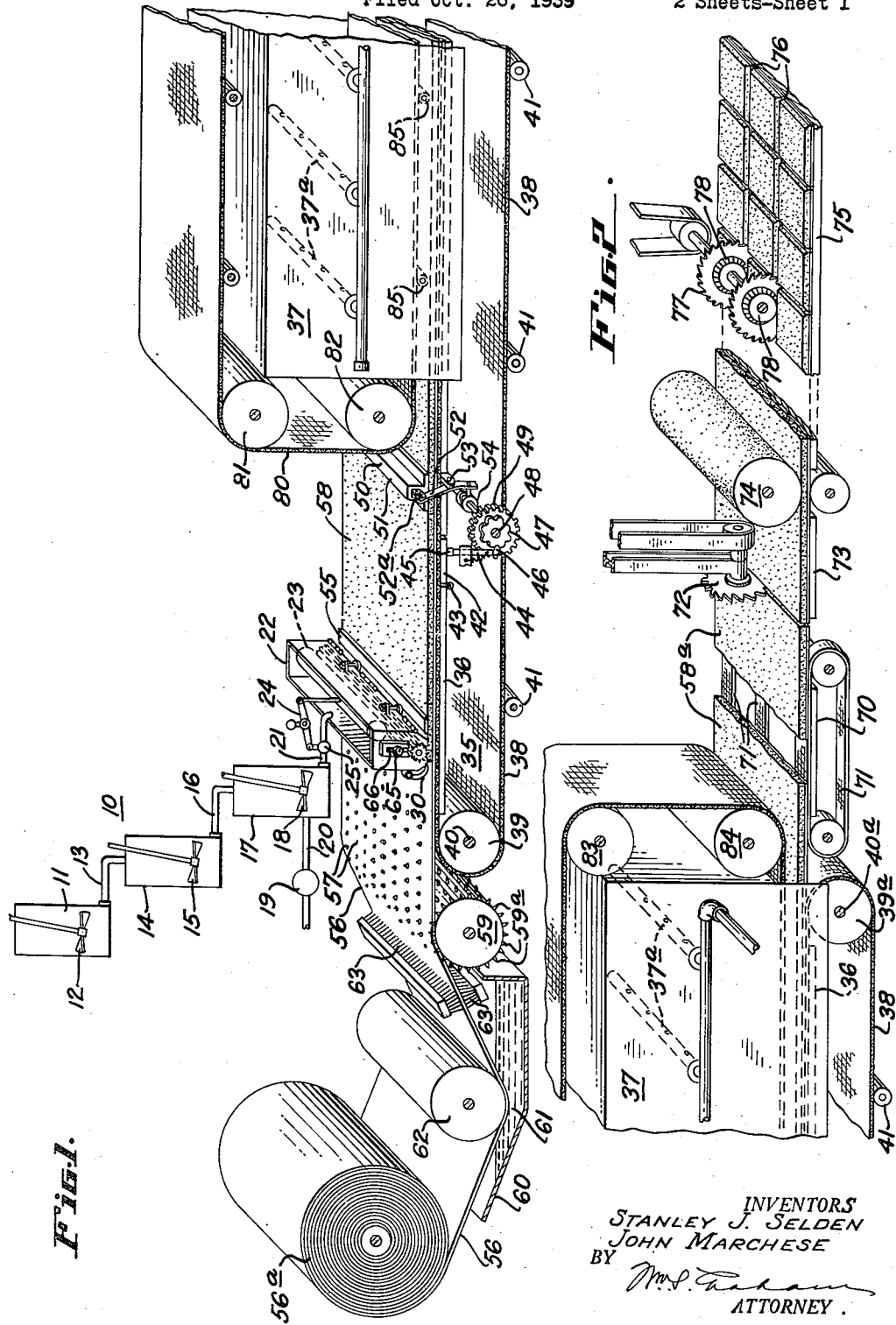

Patented June 1, 1943

2,320,702

UNITED STATES PATENT OFFICE 2,320,702

APPARATUS AND METHOD FOR MAKING COMPOSITION MATERIAL

John Marchese, Los Angeles, Calif., and Stanley J. Selden, Tacoma, Wash., assignors to Process Holdings Company, a corporation of Oregon Application October 26, 1939, Serial No. 301,448

8 Claims. (Cl. 154—1)

This invention relates to an apparatus for and method of making sheet material from a fluid mix which is generally termed a slurry, and more particularly relates to an apparatus and method for making layer or board material from a liquid slurry by a continuous process rather than by molding.

Among the objects of the invention are to provide an apparatus and method for making layer material from a wet slurry in which the material is mixed, poured, spread, mechanically manipulated, dried and otherwise treated in a continuous process.

With the foregoing and other objects in view, all of which will be more apparent as this description proceeds, the invention is exemplified in one form in the steps of the method and the novel construction and combination of parts hereinafter described, illustrated in the accompanying drawings, and pointed out in the claims hereto appended, it being understood that various changes in the form, proportion, size and details of construction of the apparatus and steps of the method may be resorted to within the scope of the appended claims without departing from the spirit or sacrificing any of the advantages of the invention.

To more clearly comprehend the invention, reference is directed to the accompanying drawings wherein:

Fig. 1 is an isometric perspective of an assembly at the front end of apparatus, partly in section and partly broken away.

Fig. 2 is an isometric perspective of an assembly at the rear end of apparatus, partly in section and partly broken away, and is a lineal continuation of the apparatus shown in Fig. 1.

Fig. 3 is an enlarged vertical transverse section showing detail of apparatus shown in Fig. 1.

Fig. 4 is an enlarged vertical view partly in section of detail of apparatus shown in Fig. 2.

Fig. 5 is an enlarged fragmentary detail of apparatus shown in Fig. 1.

Fig. 6 is an enlarged vertical view partly in section of a modification of apparatus shown in Fig. 1.

Fig. 7 is an enlarged vertical view of a modification of apparatus shown in Fig. 1.

The method is described in connection with the employment of the apparatus. The first step in the method is the mixing of materials to be employed and, in case of an aerated end product, the incorporation of air thereinto in a disperse system.

Mixing of materials to be employed may be manual or by any suitable mechanical apparatus, and the aeration thereof may be manual, mechanical, or chemical. For exemplification of one form the invention may take, there is provided a mixing assembly generally indicated 10 for making a fluid mix or slurry. The mixing assembly 10 may comprise a hopper 11 in which any suitable pulp may be mixed and stored, the hopper 11 having a conventional agitator 12, and from which a conduit 13 carries material to a second hopper 14 having a similar agitator 15 and a conduit 16 adapted to carry the agitated and mixed material or slurry to an aeration tank 17 in which the agitation of the slurry is continued by any suitable aerating means such as agitator 18 of a type adapted to whip air dispersely throughout the fluid slurry mass. If the end product is to be aeriferous, the aeration of the slurry may be facilitated by simultaneously injecting forced air into the fluid mix during the whipping thereof by suitable means such as centrifugal pump 19 through conduit 20, but it is to be understood that such aeration may be accomplished by ebullition of air or chemically by gases, such as ammonia. From the aeration tank 17, the aerated slurry is conducted by a conduit 21 to a feed hopper 22, the latter having a regulator float 23 therein, the latter being connected by a balance lever 24 which controls a valve 25 in the conduit 21 so that when the slurry in the hopper 22 is at a predetermined level, the float will operate the valve 25 to cut off the supply of slurry until the float falls below the predetermined slurry level, at which time the valve 25 is again opened through the balance lever 24. The feed hopper 22 is an elongated trough-like structure and has an elongated feed opening 26 at its lower portion. Overlying the feed opening 26 and longitudinally of the hopper, and below the normal predetermined level of the slurry in the hopper, is an elongated feed roller 27 which is rotatable on shaft 28 journalled in the end wall of the hopper. The feed roll 27 has a ribbed surface so that in transverse cross-section it has the appearance of a circular saw, the ribs 29 thus serving to feed the slurry in a substantially even flow of quantity throughout the entire length of the opening 26. To facilitate this evenness of feed from hopper 22, a scraper 30 has its edge 31 maintained in contact with the serrated face of the ribs 29 by means of a tensioned coil spring 32 wound about a pivotally mounted bar 33 from which the scraper 30 depends. Thus, the ribs are kept clean for evenly feeding the slurry since all the material picked up or carried by the ribs is successively removed and deposited on a belt, to be further described. The contact of the scraper against the ribs 29 may be further or alternately supplemented by a weighted lever 34, one end of which is fixedly connected to the rod 33. The hopper 22 provides for adjustment of the feed therefrom through opening 26. This may be accomplished in many ways, as by increasing the speed of rotation of feed roller 27, or adjusting said feed roller 27 further from the opening. As one exemplification of a suitable means for such feed adjustment, one side wall of the hopper 22 may have its lower chute portion mounted on a gate 22$^a$ hingedly connected as at 22$^b$, and adjustment of the gate may be by an adjustment screw 22$^c$ connected at one end to the gate and having its opposite end extended through a lug 22$^d$ mounted on the side wall and adjustably controlled by a nut 22$^e$.

A conveyer generally indicated 35 transversely underlies the opening 26 of hopper 22, and comprises a supporting plate preferably of sheet metal 36 which is slightly wider than the length of the hopper which extends thereacross. This supporting plate 36 extends into and through a furnace or drier 37 which may be of any suitable conventional type, being heated by any suitable and well-known means such as burners 37$^a$ shown conventionally. An endless, reticulated carrier, such as flexible wire screen belt 38 travels over the upper surface of said plate, by means of rollers 39, 39$^a$, on which the screen belt is mounted at its opposite ends, said rollers being suitably driven for rotation on shafts 40, 40$^a$. The screen belt 38 is of substantially the same transverse width as the plate 36 on which its upper reach or flight travels, and likewise extends into and through the furnace drier 37.

A sufficient number of idler rollers 41 are provided to prevent the sagging of the lower reach or flight of the screen belt 38. Spaced intermediately between the hopper 22 and the furnace dryer 37, there is a means for agitatorially manipulating the spread mix in transit, a vibrator means associated with plate 36, which is here exemplified as comprising a section 42 in the horizontal plane of the plate 36, extending the width of the plate and being hingedly connected thereto, as at 43. A vibrator hammer 44 preferably having a rubber head 45 is adapted to beat or strike against the under face of the section 42, said hammer being vibrated by the engagement of a spring tooth 46 which resiliently engages a rack gear 47 rotated on shaft 48 by a gear 49. Alternatively or inclusively, such agitating means may provide a screed 50 positioned transversely athwart and in overlying adjacently spaced relation to the screen 38, at a point before the screen enters the furnace dryer 37, said screed being spaced from the screen 38 substantially the distance of the pre-determined thickness of the completed slurry sheet and having a relatively wide flat surface to drag horizontally in parallel superficial intimate contact with the upper surface of the moving slurry, and being provided with an upstanding rib 51, to one end of which is connected an arm 52 which transversely reciprocates the screed due to oscillation of said connected end of arm 52 by pivotal mounting of the arm intermediate its ends as at 53, and an engagement of the opposite end of arm 52 in a slotted cam 54 mounted on and rotatable with shaft 48. A leveler 55 is provided closely adjacent the discharge end opening 26 of the hopper 22 and intermediate said opening 26 and the screed 50, the obvious purpose of which is to level off the slurry fed by the hopper onto the carrier screen 38, for which purpose the leveler is spaced closely adjacent to and transversely overlying screen 38. The providing of the space between screed 50 and leveler 55 and the provision of the hammer 45 and plate 42 within this space ahead of the screed 50 is so that the slurry may be settled before it reaches the drag of the screed and thereby be of thinner consistency at its upper surface.

With some types of slurries, especially those highly liquefied, it is desirable to feed them on to a suitable sheet base material such as cloth net or paper which runs on and simultaneously with the screen belt 38. For such cases there is provided preferably a base of unglazed paper 56 substantially of a width corresponding to the width of feed hopper 22. The paper base may be provided with perforations which may have been previously stamped out of the paper sheet so as to have upstanding tabs 57 which engage into the slurry 58 which is fed upon the paper sheet by the assembly of feed hopper 22. Or, the perforations and tabs 57 may be formed simultaneously with the feeding thereof by passing the paper sheet over a perforating roller 59 having upstanding cutter points 59$^a$, just prior to the paper being fed upon the screen belt 38. It is preferred that the paper 56 be somewhat absorbent so that it may be fed upon the screen belt after immersion in water and while in a moist condition which will prevent too great an absorption by the paper of moisture from that portion of slurry which is in immediate intimate contact therewith, and also compensates for a shrinkage factor which takes place in the slurry and paper upon drying. It is, however, to be understood that it is desirable that the paper absorb some portion of the moisture from the liquid of the slurry, since this permits the paper to bond firmly to the slurry sheet when dried, and also impregnates the paper with water-resisting or fire-resisting substances when such substances are included in the slurry mix. The paper 56 is received by the perforating roll 59 from an immersion tank 60 wherein it is fed through a supply of water 61 in which it is maintained immersed by a roller 62, surplus water being removed from the paper by a brush 63 or bristles of which bear lightly against each face of the paper to remove surplus water which drains back into the tank 60. The paper is supplied in synchronized feed from a paper roll 56$^a$. When absorbent paper is thus immersed in water, particularly if the paper is relatively thin, it has a tendency to wrinkle, while being fed upon the traveling screen belt 38. These wrinkles are increased in size and number if tension is exerted upon the wet sheet, such as by pulling the paper sheet upon the face of the screen. Since this tension is longitudinal of the paper sheet, these wrinkles likewise form longitudinally. Steps are therefore taken to prevent this wrinkling, and may be accomplished during the feeding thereof by exerting a laterally transverse tension on the sheet by any suitable means, such as by utilizing the perforating roller and its cutter points 59$^a$ to hold the paper against decrease of its transverse width after the wetting thereof. It is also to be noted that it has been found that some types of paper apparently have a tendency to expand when wetted, and to again shrink upon drying, and if such shrinkage is substantially out of proportion to the shrinkage of the slurry when the latter is dried, this also causes wrinkling of the paper in the end board product. Correction of this factor is also contemplated by maintaining the spread of paper as evenly as possible when it is fed under the slurry.

If desirable to adjust the thickness of the finished end product by increasing or decreasing the discharge of slurry from feed hopper 22, the hopper may be adjusted upwardly or downwardly in slots 65 of each of its supporting members 66 at its opposite ends. The screed may be likewise vertically adjustable in slots 52ª of lever 52 which supports it, it being understood that there is such a screed support at each of the opposite ends.

It is obvious, and it is to be so understood, that with certain materials and operations the mixers and aerators 11, 14 and 17 could be combined and the mixing or aeration, or both, carried out in a single receptacle such as indicated 68 in Fig. 6. Aeration may likewise be accomplished chemically by ebullition of gases, such as ammonia. In this application agitation receptacles 11, 14 and 17, including the aeration of the slurry, have been illustrated and described as three separate receptacles because they are a part of the production device actually built and operated and because that type of construction meets individual preference in the steps of mixing and aerating.

Thus far this description relates to the apparatus and steps of the method prior to passing the slurry into the furnace 37 for drying. Some materials may be air dried, particularly in climates where, or seasons when, the normal atmospheric temperature and humidity are suitable, but in most climates and average temperatures throughout the year most wet slurry materials require furnace drying in whole or in part, in sustained and continuous commercial production.

As heretofore stated, the metal plate supporting member 36 extends through the furnace drier 37 and the screen belt 38 travels thereover. Likewise, the slurry fed by hopper 22 upon the paper 56 travels upon the paper base with the screen belt. Prior to entering the furnace and while still in its liquid condition, the spread of slurry is first leveled adjacent the hopper outlet by the leveler 55 and is then "settled" so that the upper surface is more moist or more liquid than the lower portion of the viscous moving slurry body or slab. This settling is facilitated by the vibrating hammer 44 against plate section 42 or by spacing the leveler 55 and the screed 50 sufficiently so that during the time of travel therebetween there is a natural and normal settling by physical phenomena. Having first been leveled and "settled," the slurry is manipulated transversely by the screed 50 in facial contact with the upper surface of the slurry. It is not absolutely essential that both methods of settling the slurry be employed simultaneously. It has been found that either one or the other may be advantageously employed independently, or both simultaneously. If one only is employed, the spacing of the leveler from screed 50 is preferred. The contact of the operative face of the screed with the slurry material is more than superficial. While it is not embedded appreciably in the slurry, it contacts with sufficient intimacy so that the reciprocation more than merely smoothes the top surface. The action is more similar to a drag on the fluid slurry material so that the body of the material is dragged back and forth by the reciprocation of the screed somewhat in the nature of a massage. In stating that the vibrator and screed are transversely of the screen 38, it is not intended that they must be perpendicularly transverse, since they may also be disposed obliquely transverse if desired. Just what physical phenomena are accomplished by the agitatorial action of the vibrator and screed is not well recognized, but it has been demonstrated that the end product is much superior in appearance, uniformity of texture and resistance to cracking or peeling, if the fluid and spread slurry is thus manipulated before it enters the drying furnace. Without intending to be concluded by any particular theory of the result of such manipulation, it is believed that such manipulation of the wet slurry probably accomplishes several results, among which may be mentioned that the "fines" in the material are brought nearer the surface, thus making the surface of the finished product much more uniform in appearance and texture. Secondly, most of such materials contain some kind of fibrous or flaky binder material, and it has been observed that when this type of screed manipulation is employed there appears a noticeable tendency of the fibers at the opposite surface portions of the material, for a depth of about one-eighth of an inch, to become aligned more or less longitudinally of the direction of movement of the material on the screen 38, while the fibres of the intermediate or vertically central portion of the body remain miscellaneously arranged or helter-skelter, which results in an end product having the nature of laminated layers with fibres somewhat relatively perpendicularly arranged in the abutting layers, thus giving an exceptional degree of strength to the end product slab or board. Since the frictional surface tension resistance to transverse movement of the entire slurry is at the opposite faces which are in contact with the paper and screen (at bottom) and screed (at top), it is advanced as a belief that the dragging or massaging by the screed noticeably rearranges the fibres adjacent the opposite surfaces. Thirdly, such manipulation probably causes the heavier portions of the slurry to settle to some extent so that more of the free water in the slurry is nearest its upper surface, and since the bottom surface of the slurry is coated with paper resting upon the screen belt and the metal plate whereas the upper surface is completely exposed, the heat in the furnace drier more readily evaporates the water in the upper portion of the slurry than in the lower portion; if the upper portion of the spread slurry carries a greater percentage of water than the lower portion, this more exposed and more rapid drying of the upper portion of the slurry equalizes the lesser liquidity and lesser exposure of the bottom portion so that drying is equalized throughout the slurry body and prevents warping and cracking in the finished product. The perforations in the base paper 56 materially assist in uniform drying of the lower portion of the slurry by permitting ready escape of steam through the reticulated body of the underlying screen, especially where the sheet 56 becomes water-proofed, as above stated.

It is desirable to employ a temperature between 300° F. and 400° F. in the furnace drier, an average application of 350° F. for a period of one to two hours having been found satisfactory in order to practically dehydrate a slab of porous material or loose, flaky material in sheet layers, which are approximately one-half to three-quarters of an inch in thickness. At the opposite end of the furnace 37, the slurry, which has then become dry board 58ª, is discharged from the supporting plate 36 and screen belt 38 upon a table 70 having a series of longitudinal conveyer belts 71 which continue to transport the strips of board 58a. The strips are cut into suitable lengths by any type of rotary saw 72. The boards are then passed to a second table 73 where the upper surface thereof (the surface which is not coated with paper) may be sanded by any suitable type of sanding roller 74 so as to give it a uniform and plumb finish, as well as exposing the interstitial air cells which may have been sealed by a baked crust or coat on the upper surface. At this point, the board is completed as a commercial product if it is to be employed solely in linear pieces. If, however, it is desired to make blocks of the material having bevel edges for ornamental purposes, the boards may be passed through a further operation for simultaneously cutting the board into the desired sizes and shapes and beveling the edges thereof. This latter apparatus comprises a table 75 having slot 76 therein, in which slot there are rotatably mounted circular saws 77. On each side face of saws 77 there are supplemental bevel saw plates 78 which are very much of similar cross-section to a bevel gear with saw teeth substituted for gear teeth.

The foregoing description of apparatus and method of operation provides a most satisfactory board end product when employing carefully prepared, sufficiently viscous and well-balanced types of slurry. However, some types of slurry, especially those in which the material which makes up the principal bulk has a decided tendency to flake or crumble when dried, or in slurry which lacks sufficient gelatinous or fibrous binders, or in slurry which is overloaded with water, there is an ever-present tendency to crack, spall or peel and warp when dried. This tendency may be overcome by providing a layer of thin sheet material over the upper or exposed face of the slurry during the drying operation. This material, which may be briefly termed an overcover to distinguish it from the underlying sheet of base material, may comprise a perforated paper sheet, cheesecloth or other reticulated textile material, or any other type of sufficiently porous, netted or perforated sheet material. Mechanically, it may be a fine mesh screen which may operate as an endless screen belt through the furnace in close overlying relation to the spread wet slurry being conveyed therethrough. It is not the purpose that this overcover must necessarily become an integral part of the finished end product board; it is to serve as a porous buffer overlying the said upper surface during drying, and, therefore, its essential characteristic is not so much its material, as that it have sufficient porosity or openings to permit evaporation therethrough of the moisture in the slurry. By so protecting the upper surface during drying, the cracking and warping are prevented. Just why this is so has not been definitely determined; probably it causes moisture centrally of the slurry thickness to evaporate more evenly with the more exposed moisture on and closely adjacent the upper surface, since it has been demonstrated that much higher drying temperatures may be employed in the furnace dryer when such an overcover is employed, and this results in great saving of time necessary for drying. As one exemplification of this optional step of the invention, there is provided a reticulated belt 80 such as mesh web textile or fine mesh screen, mounted on supporting rollers 81, 82, 83, 84, and guided into and through the furnace dryer by idler rollers 85, so that it overlies in close proximity to the exposed face of the slurry while passing through the drying furnace.

For ease of supporting the belt, the more rigid body of a fine mesh screen may be preferred, but for lightness of weight to avoid sagging a meshed textile in direct contact with the slurry may be preferred. Referring to Fig. 7, it is obvious that if perforated paper or thin mesh cloth, such as cheese cloth, be employed as this overcover, it may be layed directly upon the surface of the traveling wet slurry by substituting a roll 81ª of paper or cheese cloth 80ª for the roller 81 and screen 80, and providing pointed burrs or points on the lower feed roller 82ª, just prior to entering the furnace, so as to perforate the paper in the one case or grip the mesh of the cheese cloth if the latter is employed. The overcover sheet material 80ª may, if desired, become an integral part of the finished board product in like manner as the base sheet 56, as previously set forth.

We claim:

1. An apparatus for making sheet material from a fluid mix including means for mixing suitable material into a fluid slurry, an elongated continually movable carrier, a hopper having a discharge outlet transversely overlying the carrier for feeding fluid slurry on said carrier, said hopper including a rotatable ribbed feed roller at its discharge outlet, and a scraper adapted to enter between the ribs and remove slurry therefrom, means operative simultaneously with the transit of the slurry on the carrier for agitatorially manipulating the slurry, and a drying furnace adapted for receiving the carrier and subjecting the fluid slurry thereon to heat and evaporation of its moisture whereby it is changed from a fluid mix to a stable sheet body.

2. An apparatus for making sheet material from a fluid mix including means for mixing suitable material into a fluid slurry, an elongated continually movable reticulated belt carrier, means to feed sheet base material on said carrier, means to perforate and wet said base material before the feeding thereof, a hopper having a discharge outlet transversely overlying the carrier for feeding fluid slurry on said carrier, said hopper including a rotatable ribbed feed roller at its discharge outlet, and a scraper adapted to enter between the ribs and remove slurry therefrom, means operative simultaneously with the transit of the slurry on the carrier for agitatorially manipulating the slurry, and a drying furnace adapted for receiving the carrier and subjecting the fluid slurry thereon to heat and evaporation of its moisture whereby it is changed from a fluid mix to a stable sheet body.

3. An apparatus for making sheet material from a fluid mix including means for mixing suitable material into a fluid slurry, a movable carrier, means for feeding fluid slurry on said carrier, means overlying the carrier and spaced therefrom substantially the distance of the thickness of the completed slurry sheet prior to drying thereof, said means being adapted for agitatorially manipulating the slurry at its upper surface, means for reciprocating said last mentioned agitating means laterally to the direction of movement of the carrier, means for leveling the slurry interposed between the feed means and the said agitating means, and a drying furnace adapted for receiving the carrier and subjecting the fluid slurry thereon to heat and evaporation of its moisture whereby it is changed from a fluid mix to a stable sheet body.

4. An apparatus for making sheet material from a fluid mix including means for mixing suitable material into a fluid slurry, an elongated continually movable carrier, means to feed sheet base material on said carrier, means for feeding fluid slurry on said sheet base material on said carrier, means having a solely laterally reciprocal horizontal and substantially parallel dragging contact with the upper surface of the slurry and operative simultaneously with the transit of the slurry on the carrier for agitatorially manipulating the slurry, means for leveling the slurry interposed between the feed means and said dragging contact means, and a drying furnace adapted for receiving the carrier and subjecting the fluid slurry thereon to heat and evaporation of its moisture whereby it is changed from a fluid mix to a stable sheet body.

5. In an apparatus of the character described, the combination of means for mixing suitable material into a fluid slurry, an elongated continually movable carrier, and means for receiving the fluid slurry from the mixing means and depositing it on the carrier comprising a hopper having a discharge outlet transversely overlying the carrier, said hopper including a rotatable ribbed feed roller at its discharge outlet, and a scraper adapted to enter between the ribs of the roller and remove slurry therefrom.

6. A method of making dried sheet material from a fluid slurry comprising the steps of mixing a fluid slurry, feeding sheet base material on a conveyor, feeding the fluid slurry upon said sheet base material on the conveyor, leveling the upper surface of the spread slurry to provide substantially uniform thickness thereof, and thereafter agitatorially manipulating the upper portion of the spread slurry on the conveyor laterally transversely to its direction of movement and simultaneously with conveying thereof by the conveyor, and drying the fluid slurry to a stable sheet form.

7. A method of making dried sheet material from a fluid slurry comprising the steps of mixing a fluid slurry, moistening sheet base material and feeding it onto a conveyor, feeding the fluid slurry upon said sheet base material simultaneously with conveying thereof, leveling the slurry to a substantially uniform thickness of spread during conveying same, settling the leveled slurry after the leveling thereof, and thereafter agitatorially manipulating the upper portion of the spread slurry by a superficially intimate contact drag thereon transversely of its direction of movement by the conveyor, and drying the fluid slurry to a stable sheet form.

8. A method of making dried sheet material from a fluid slurry comprising the steps of mixing a fluid slurry, aerating the fluid slurry mass, moistening and perforating sheet base material and feeding it onto a perforated conveyor, feeding the aerated fluid slurry upon the moistened and perforated sheet base material on the conveyor, leveling the spread slurry to a substantially uniform thickness of spread thereof, thereafter subjecting the aerated and leveled slurry to a superficially intimate contact drag on the upper surface thereof transversely to its direction of movement on the conveyor, and applying heat to the fluid slurry in transit to dry it to a stable sheet form.

JOHN MARCHESE.
STANLEY J. SELDEN.